No. 857,357. PATENTED JUNE 18, 1907.
E. A. MULLER.
SPEED CHANGING MECHANISM.
APPLICATION FILED MAR. 24, 1905.
2 SHEETS—SHEET 2
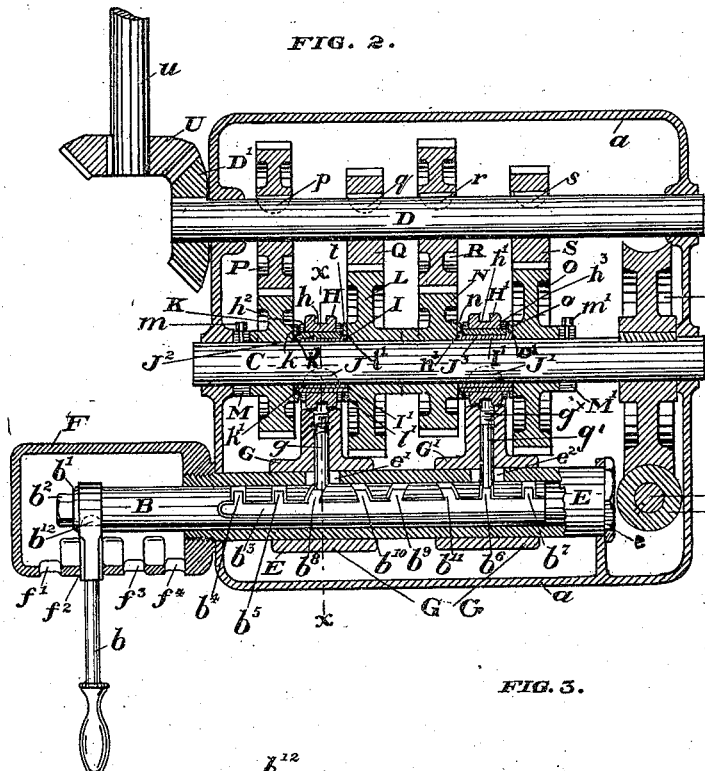
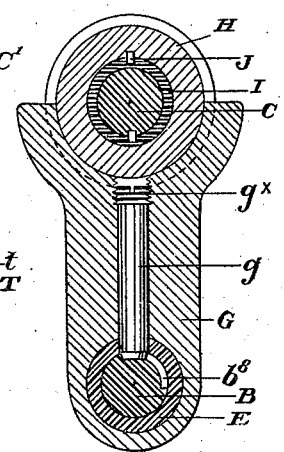
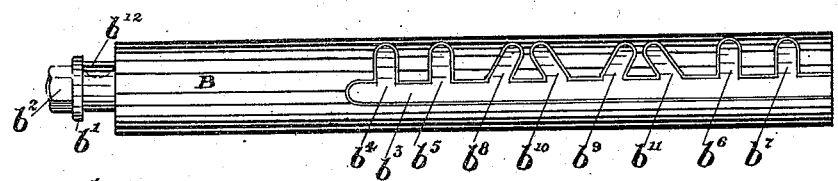
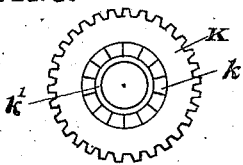
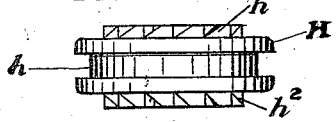
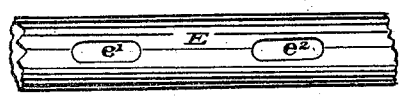
WITNESSES:
Edward A. Muller, INVENTOR.
BY
Walter A. Knight, ATTORNEY.

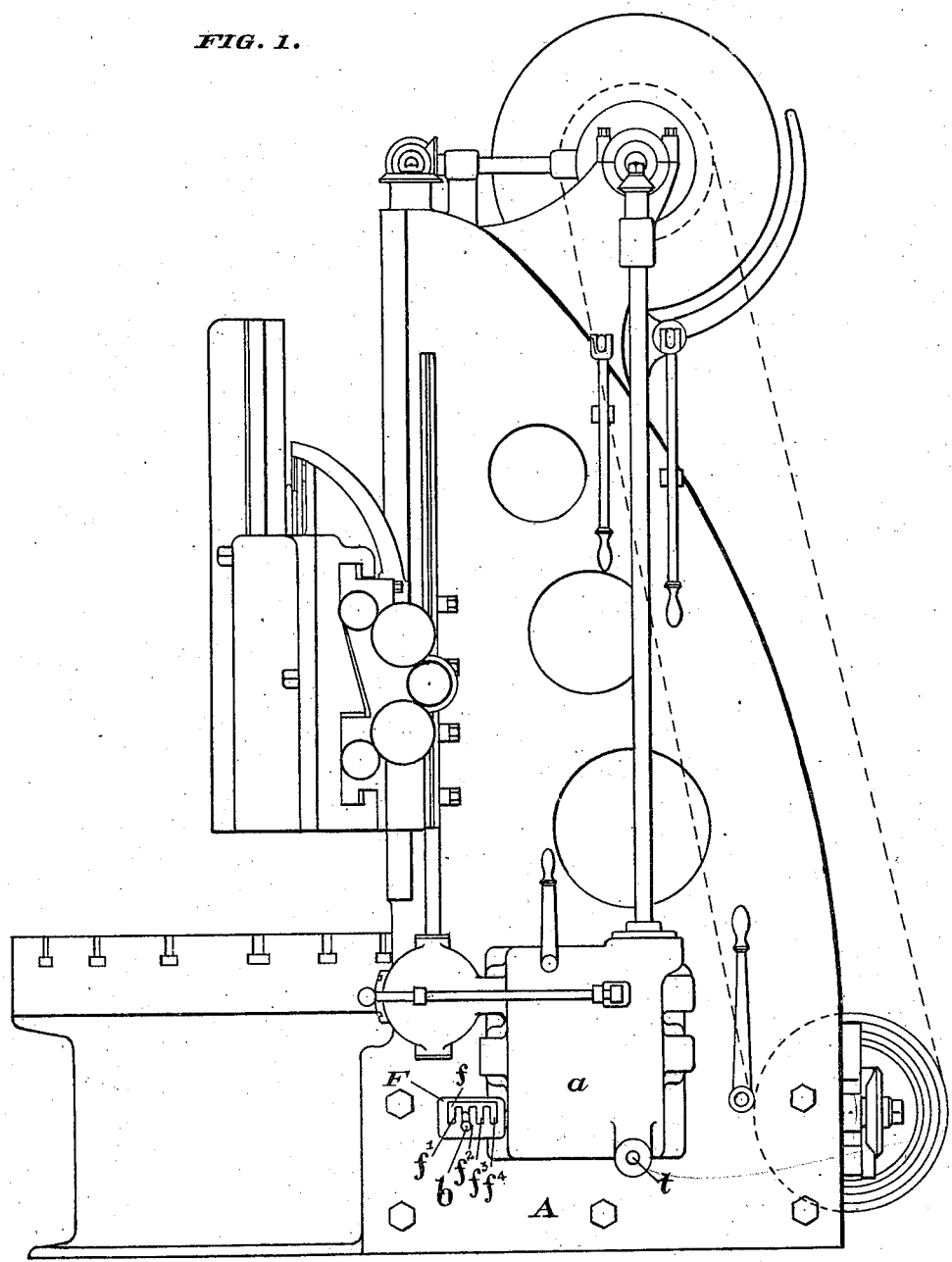

UNITED STATES PATENT OFFICE.

EDWARD A. MULLER, OF MADISONVILLE, OHIO, ASSIGNOR TO THE KING MACHINE TOOL COMPANY, OF WINTON PLACE, OHIO, A CORPORATION OF OHIO.

SPEED-CHANGING MECHANISM.

No. 857,357.　　　　Specification of Letters Patent.　　　　Patented June 18, 1907.

Application filed March 24, 1905. Serial No. 251,860.

*To all whom it may concern:*

Be it known that I, EDWARD A. MULLER, a citizen of the United States, residing at Madisonville, in the county of Hamilton and State of Ohio, have invented new and useful Improvements in Speed-Changing Mechanism, of which the following is a specification.

This invention relates to speed changing mechanism employing positive clutch engaged gearing, and while particularly adapted to use on machine tools, may be used for any purpose. Its construction is such that with one lever any one of a series of gears may be quickly and positively engaged, and that while so engaged all the other clutches are positively held disengaged; neither between points of engagement can there be any chance engagement, therefore no injury can result to the machine by any inadvertence of the operator.

In the particular embodiment of my invention selected for illustration:—Figure 1, is a side elevation of a boring mill, showing my improvement applied. Fig. 2, is an axial section of my improvement. Fig. 3, is a plan view of the shifter shaft. Fig. 4, is a cross-section through the clutch, shifter arm, change gear shaft, shifter shaft, pin, and attendant parts, along line X, X, Fig. 2. Fig. 5, is a face elevation of one of the gears on shaft, C. Fig. 6, is a side elevation of one of the gears on shaft, C, on the clutch side. Fig. 7, is a plan view of the clutch member. Fig. 8, is a plan view of that part of sleeve, E, which is pierced by shifter arm pins, with both ends broken away.

In the drawings, A, designates the frame of the machine and, a, the housing of the change speed mechanism. Within this housing is a shaft, B, preferably horizontal in position, and shafts, C, and D, parallel to B.

B, is a shifter shaft incased throughout that portion within the housing, a, in a sleeve E, which sleeve is terminated on one end by a cap-nut, e, and on the other by an index cylinder, F. Into this index cylinder shaft B, projects and to that end of this shaft, is rotatively attached as by key, $b^{12}$, at right angles to it, a lever handle, $b$, held in place in any convenient manner as by washer, $b^1$, and nut, $b^2$, while the cylinder itself has short slots cut circumferentially which are connected at one end by a slot, $f$, cut lengthwise of the cylinder. Through these slots extend the lever, $b$, and the slots themselves, of which there may be any number, may for convenience in explaining the operation, be designated as $f^1, f^2, f^3, f^4$. The shaft, B, is adapted to rotate only the distance the handle, $b$, rotates in the slots of the index cylinder and has a longitudinal motion equal to the motion of the lever, $b$, in the slot, $f$.

The portion of the shifter shaft, B, that operates within the sleeve, E, has a suitable shaped longitudinal groove, $b^3$, and extending from the groove, $b^3$, preferably on one side thereof, and that side opposite the side of the slot, $f$, on which slots $f^1$, to $f^4$, are placed, are cut grooves. There will be twice as many grooves, $b^4, b^5, b^6, b^7$, circumferential in direction as there are pairs of gears, adapted to be operated by the clutches on gear shaft, C. There will be as many grooves, $b^8, b^9$, inclined obliquely to the right from groove, $b^3$, as shown in Figs. 2 and 3, as there are said pairs of gears and a like number of grooves, $b^{10}, b^{11}$, inclined obliquely to the left from groove $b^3$. These grooves are so arranged that when either plunger pin, $g$, or $g^1$, enters an oblique groove, the other of said pins will enter one of the straight grooves and vice versa, so that both pins enter grooves at the same time, or neither. These grooves, $b^3$, to $b^{11}$, are of size and shape adapted to receive a pin, $g$, or $g'$ fastened securely in clutch shifter yoke, G, or G' one end of which is made in the form of a sleeve adapted to fit loosely on sleeve, E. As shown in the drawing each pin fits closely through a shifter yoke, and is threaded into place at $g^x$, Fig. 4. The sleeve, E, has a longitudinal slot, $e^1$, for the pin, $g$, where it pierces, E, in entering the grooves in shaft, B.

The shifter yoke, G, is adapted to fit loosely in the circumferential groove, $h$, of the double clutch member, H. This clutch member is splined to the sleeve, I, between two of the gears which are arranged in pairs, and sleeve, I, is keyed to the shaft, C, by key, J. The sleeve, I, is longer than the hub of clutch member, H, so that loose gears, K, and L, are prevented from getting too close together.

The gear, K, is held against receding from the clutch member by any suitable means as collar, M, with its set-screw, $m$, or the housing.

Gears, L, and N, abut, and hence hold each other in place, and gear, O, is held outwardly by a collar, M¹, with its set screw, m¹, or the housing. Each of the gears which are arranged in pairs has a fixed clutch member cast or rigidly attached to its inner hub face; which clutch members are designated by the same small letter as the large used to symbolize the gear; as $k, l, n, o$. Each gear hub has an inner circumferential recess indicated by the lower case of its symbol letter marked, ¹, as $k^1, l^1, n^1, o^1$. This recess is next the shaft, to admit the sleeve, I, or I¹.

Clutch member, H, is splined to sleeve, I, by key, J². Both clutch mechanisms shown in drawing being alike in construction and operation, similar parts in the second are lettered like those in the first except that each has the next higher index numeral. Clutch teeth, $h^2$, on each side of the clutch member, H, and $h^3$, on each side of the clutch member, H¹, are adapted to engage the gear clutch teeth adjoining.

At one end of shaft, C, rotatively attached to it, is a driven gear, C¹, which may be a worm wheel, meshing with and actuated by the worm, T, rotatively attached to the shaft, $t$, driven by outside means not shown.

Shaft, D, has gears, P, Q, R, S, rotatively attached to it, in any convenient manner as by keys, $p, q, r, s$, and said gears are of such size and so arranged that they mesh with the gears on shaft, C, securing rotation of shaft, D, at any of the several speeds. At one end of shaft, D, rotatively attached to it, is a gear, D¹, from which power is transmitted to gear, U, and shaft $u$, and the speed of their rotation will depend upon which of the gears on shaft, C, is engaged by its clutch member.

The operation is as follows: Assuming that the handle $b$, is at some point in the slot, $f$, let it be drawn to the point where slot, $f^1$, enters slot, $f$, and rotated so that said handle will enter slot, $f^1$. The shaft, B, will then be in such a position that yoke, pin, $g$, enters groove $b^{10}$, when yoke, pin, $g^1$, will enter groove $b^7$. It is apparent that pin, $g$, and its yoke will bear to the left and force clutch member, H, in the same direction so that teeth, $h^2$, on that side of the clutch member, H, engage teeth, $k$, on the gear, K, whereupon shaft, C, which is constantly rotating, causes gear, K, to rotate, and K, transmits motion to gear, P, which being keyed to shaft, D, rotates said shaft and attached gear, D¹, and through, D¹, transmits motion to gear, U, and shaft, $u$. Pin, $g^1$, enters, $b^7$, which being a straight slot, holds through the pin and its yoke, the clutch member, H¹, midway between gears, N and O, and disengaged from both. Again rotating the lever, $b$, back to slot, $f$, let it be drawn to the point where slot, $f^2$, enters slot, $f$, and rotates $b$, so that it enters, $f^2$. As a result the position of parts will be those shown in Fig. 2, where pin, $g$, entering groove $b^8$, has been pushed to the right carrying clutch member, H, into contact with the clutch teeth, $l$, of the gear, L, causing, L, to rotate gear, Q, shaft, D, etc.; while pin, $g^1$, having entered the straight groove, $b^6$, held the clutch member, H¹, out of contact with both gears, N and O. Again changing the position of lever, $b$, in the same manner as before, but to $f^3$, pin, $g$, enters straight groove, $b^5$, and pin, $g^1$, enters oblique groove, $b^{11}$, resulting in clutch member, H, being held disengaged and clutch H¹, engaging clutch teeth, $n$, of gear, N, thus rotating gears, N, and R, shaft, D, etc. Again changing the position of lever, $b$, in like manner but to $f^4$, the shaft, $b$, is shifted to such a position that pin $g$, enters straight groove, $b^4$, holding clutch member, H, disengaged and pin, $g^1$, enters, $b^9$, throwing the clutch member, H¹, into mesh with the clutch member, $o$, of the gear, O. The rotation of gear, O, with shaft, C, causes rotation of shaft, D, and attendant parts through rotation of gear, S.

Additional gears similarly arranged and a corresponding increase of suitable grooves in shaft, B, and slots in index case, F, will supply such other speeds as are desired.

I claim as my invention and desire to secure by Letters Patent of the United States:—

1. In a variable speed mechanism, the combination of a driving shaft, different sized driving gears thereon provided with clutch members, shiftable clutch members movable into and out of operative engagement with the first-named members, and means including a shiftable shaft provided with longitudinal grooves and other grooves extending therefrom, some obliquely and others circumferentially, and connections from the shiftable clutch members to said shaft and so arranged that but one clutch actuating connection will engage an oblique groove at any time, the other clutch actuating connections entering the straight grooves.

2. In a variable speed mechanism, the combination of a driving shaft, normally loose gears thereon provided with clutch members, a plurality of double clutch members on the shaft and shiftable between pairs of gears, a unitary longitudinally-shiftable axially-turnable shaft, and connections between said shaft and the double clutch members, said shaft capable of moving one double clutch into operative engagement with a loose gear and coördinately holding all other double clutches inoperative.

3. In a variable speed mechanism, the combination of a driving shaft, normally loose gears thereon, arranged in pairs, said gears having clutch teeth on their contiguous sides, a double clutch rotatively attached to and slidable on the shaft between the gears constituting each pair, a yoke adapted to actuate each clutch, a shifter shaft having a longitudinal groove and other grooves extending therefrom, some bearing obliquely toward each end and others circumferential in direction, so arranged as to permit but one yoke connection to enter any oblique groove at any time, all others entering straight grooves and means for adjusting said shifter shaft.

4. In a variable speed mechanism, the combination of a driving shaft, normally loose, different sized driving gears fitted with clutch teeth mounted thereon, clutch members rotatively attached to and slidable on said shaft, adapted to engage said gear clutch teeth, a yoke and yoke pin adapted to operate said clutch members, a shifter-shaft having a longitudinal groove and other grooves extending in one direction therefrom, some bearing obliquely toward each end, and others circumferential in direction, so arranged as to permit but one yoke pin to enter oblique grooves at any time, all others entering straight grooves and means for adjusting said shifter shaft.

5. In a change speed mechanism, a shifter shaft having a longitudinal groove and other grooves extending in one direction therefrom, some bearing obliquely toward each end, and others circumferential in direction, a clutch yoke provided with pins, said grooves so arranged as to permit but one yoke pin to enter oblique grooves at any time, all others entering straight grooves, clutch members operable by the yoke, and means for adjusting said shifter shaft.

6. In a change speed mechanism, the combination of change gears provided with clutch members, shiftable clutch members engageable with the first named members, a clutch yoke provided with pins said yoke being projected so as to form a loose sleeve, a shifter shaft having a longitudinal groove and other grooves extending in one direction therefrom, some bearing obliquely toward each end, and others circumferential in direction, said grooves so arranged as to permit but one yoke pin to enter oblique grooves at any time, all others entering straight grooves, a fixed sleeve surrounding the shaft and having longitudinal slots adapted to allow a free limited movement of each yoke pin, and means for adjusting the shifter shaft.

7. In a change speed mechanism, the combination of change gears provided with clutch members, shiftable clutch members engageable with the first-named members, a clutch yoke provided with pins said yoke being projected so as to form a loose sleeve, a shifter shaft having a longitudinal groove and other grooves extending in one direction therefrom, some bearing obliquely toward each end, and others circumferential in direction, said grooves so arranged as to allow but one yoke pin to enter oblique grooves at any time, all others entering straight grooves, a fixed sleeve surrounding the shaft and having longitudinal slots adapted to allow a free limited movement of each yoke pin, a handle rigidly attached to the shifter shaft, and an index cylinder having a longitudinal slot and other slots arranged substantially at right angles thereto arranged to receive said handle and hold the same when the shifter shaft is in operative position.

In testimony whereof I have hereunto set my hand in presence of two subscribing witnesses.

EDWARD A. MULLER.

Witnesses:
 BURTON O. GREGG,
 JOSEPH R. GARDNER.